United States Patent
Baddeley et al.

(10) Patent No.: US 11,464,029 B2
(45) Date of Patent: Oct. 4, 2022

(54) SDMM: A METHOD FOR ADAPTIVE SCHEDULING OF MAC PROTOCOLS IN A MESH NETWORK BASED ON LOCAL NETWORK STATE INFORMATION

(71) Applicant: Kabushiki Kaisha Toshiba, Minato-ku (JP)

(72) Inventors: Michael Baddeley, Bristol (GB); Yichao Jin, Bristol (GB); Xinyu Ni, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 206 days.

(21) Appl. No.: 16/664,367

(22) Filed: Oct. 25, 2019

(65) Prior Publication Data

US 2021/0127406 A1    Apr. 29, 2021

(51) Int. Cl.
  *H04W 72/12* (2009.01)
  *H04W 74/08* (2009.01)
  *H04W 72/04* (2009.01)
  *H04W 80/02* (2009.01)
  *H04W 84/18* (2009.01)

(52) U.S. Cl.
  CPC ... *H04W 72/1231* (2013.01); *H04W 72/0446* (2013.01); *H04W 74/0808* (2013.01); *H04W 80/02* (2013.01); *H04W 84/18* (2013.01)

(58) Field of Classification Search
  CPC ............. H04W 72/1231; H04W 84/18; H04W 72/0446; H04W 74/0808
  See application file for complete search history.

(56) References Cited

U.S. PATENT DOCUMENTS

| | | | |
|---|---|---|---|
| 2009/0238160 A1* | 9/2009 | Bhatti | H04W 74/0808 370/338 |
| 2017/0324443 A1* | 11/2017 | Turner | H04W 4/80 |
| 2018/0167955 A1* | 6/2018 | Prakash | H04W 8/005 |

(Continued)

FOREIGN PATENT DOCUMENTS

WO    WO2017/037403 A1    3/2017

OTHER PUBLICATIONS

Salvatore Costanzo, et al., "Software Defined Wireless Networks: Unbridling SDNs", 2012 European Workshop on Software Defined Networking, Oct. 2012, 6 pages.

(Continued)

*Primary Examiner* — Muthuswamy G Manoharan
(74) *Attorney, Agent, or Firm* — Oblon, McClelland, Maier & Neustadt, L.L.P.

(57) ABSTRACT

Method for transmitting data from a plurality of child nodes to a parent node in a wireless network, wherein each child node is configured to send messages directed to a root node of the network via the parent node, the method comprising the parent node: dividing a first time period into a plurality of timeslots; assigning a MAC protocol to one or more child node for transmission of data to the parent node during the first time period; allocating one or more of said plurality of timeslots into which the first period is divided to said one or more child nodes for transmission to the parent node according to the MAC protocol assigned to them; transmitting details of the respective assigned MAC protocol and allocated timeslot to said one or more child nodes.

18 Claims, 9 Drawing Sheets

(56) References Cited

U.S. PATENT DOCUMENTS

2019/0215867 A1\* 7/2019 Cheng .................. H04W 24/10
2020/0136964 A1 4/2020 Baddeley et al.

OTHER PUBLICATIONS

Laura Galluccio, et al., "SDN-WISE: Design, prototyping and experimentation of a stateful SDN solution for Wireless Sensor networks", 2015 IEEE Conference on Computer Communications (INFOCOM), Apr. 2015, pp. 513-521.
Tryfon Theodorou, et al., "CORAL-SDN: A Software-Defined Networking Solution for the Internet of Things", 2017 IEEE Conference on Network Function Virtualization and Software Defined Networks (NFV-SDN), Nov. 2017, 2 pages.
Michael Baddeley, et al., "Isolating SDN Control Traffic with Layer-2 Slicing in 6TiSCH Industrial IoT Networks", IEEE NFV-SDN 2017—Fourth Workshop on Network Function Virtualization and Programmable Networks, Nov. 2017, pp. 247-251.
Federico Ferrari, et al., "Efficient Network flooding and Time Synchronization with Glossy", Proceedings of the 10th ACM/IEEE International Conference on Information Processing in Sensor Networks, Apr. 2011, pp. 73-84.
Timofei Istomin, et al., "Data Prediction+Synchronous Transmissions= Ultra-low Power Wireless Sensor Networks", Proceedings of the 14th ACM Conference on Embedded Network Sensor Systems CD-ROM, ser. SenSys '16. ACM, 2016, 13 pages.
Federico Ferrari, et al., "Low-Power Wireless Bus", Proceedings of the 10th ACM Conference on Embedded Network Sensor Systems, ser. SenSys '12. ACM, 2012, 15 pages.
Nicola Accettura, et al., "Decentralized Traffic Aware Scheduling in 6TiSCH Networks: Design and Experimental Evaluation", IEEE Internet of Things Journal, vol. 2, No. 6, Dec. 2015, pp. 455-470.
Usman Raza, et al., "Competition: Synchronous Transmissions based Flooding for Dependable Internet of Things", International Conference on Embedded Wireless Systems and Networks (EWSN), Feb. 20-22, 2017, pp. 278-279.
Michael Baddeley, et al., "Atomic-SDN: Is Synchronous Flooding the Solution to Software-Defined Networking in IoT?", IEEE Access, May 2019, 16 pages.
Le Tian, et al., "Real-Time Station Grouping under Dynamic Traffic for IEEE 802.11ah", Sensors, 2017, 24 pages.

\* cited by examiner

SDMM: A METHOD FOR ADAPTIVE SCHEDULING OF MAC PROTOCOLS IN A MESH NETWORK BASED ON LOCAL NETWORK STATE INFORMATION

FIELD

Embodiments disclosed herein relate generally to methods and devices for scheduling transmissions in wireless networks.

BACKGROUND

Industrial monitoring and control applications often involve expensive cabling to connect a large number of devices and sensor units across an industrial plant, which can be expensive to install, operate and maintain. On the other hand, a wireless IoT (Internet of Things) network is a much cheaper alternative with many attractive features including minimal infrastructure requirements, lower cost, little wear and tear, and more flexibility and accessibility, compared to using wires.

Low power and lossy networks (LLNs) are a type of wireless sensor network in which the nodes are highly resource constrained and the communication link is highly variable. In a low power and lossy network the sensor nodes are typically limited in terms of processing power, battery and/or memory and are likely to be operating in a highly variable wireless environment with low data and packet delivery rates. IEEE 802.15.4 is a communications standard which has been specifically designed with low-rate wireless personal area networks in mind and is incorporated herein by reference.

Unlike wired networks, where the routing topology is imposed by the physical wires, low-power and lossy networks such as IEEE 802.15.4 do not typically have pre-defined topologies. As a result, there exist protocols allowing nodes to self-organise and establish ad-hoc connections. Over the past decade the Routing Protocol for Low-Power and Lossy Networks (RPL) has provided a lightweight and distributed mechanism allowing mesh networks to both discover and maintain routing topologies, and now forms integral part of many low-power wireless networks. RPL commonly creates topologies where information is forwarded towards a single location—known as the root node—using a Direction Orientated Directed Acyclic Graph (DODAG).

In RPL, when a node joins the DODAG, it selects a parent node from its one-hop neighbouring nodes based on a number of factors. All messages sent from the node and directed to the root node are transmitted via the selected parent node. Since a node only requires information about its parent to communicate with the root node, RPL requires very little information to communicate data. This characteristic is particularly advantageous for devices which are constrained in terms of processor and memory.

Extremely large wireless mesh networks can be distributed over wide areas, causing performance (such as reliability, latency, and throughput) to vary considerably depending on local environmental factors. These factors may include both sparse and dense topologies, local weather conditions, differences in nearby surfaces (such as buildings or foliage), and sub-domains may be locally subject to various levels of external interference from other nearby devices. Furthermore, local networking requirements may differ depending on application, and may be localised to specific parts of the mesh. For example, while one application may involve periodic data collection, another application may be concerned with high-throughput firmware updates.

In such extremely large mesh networks, conventional topology routing mechanisms (such as RPL) mean data generated at the edges of the network often must traverse tens of hops to arrive at single root node. The tree-like RPL DODAG creates funnelling effects as parents are forced to serve messages from multiple children, causing increased use of buffer and spectrum resources nearer the root node.

Additionally, local clusters within the mesh may experience contention and retransmissions due to unreliable local radio conditions or may require different Quality of Service (QoS) guarantees due to multiple different applications running on different areas of the network.

Arrangements of the present invention will be understood and appreciated more fully from the following detailed description, made by way of example only and taken in conjunction with drawings in which.

DETAILED DESCRIPTION

Figure 1:
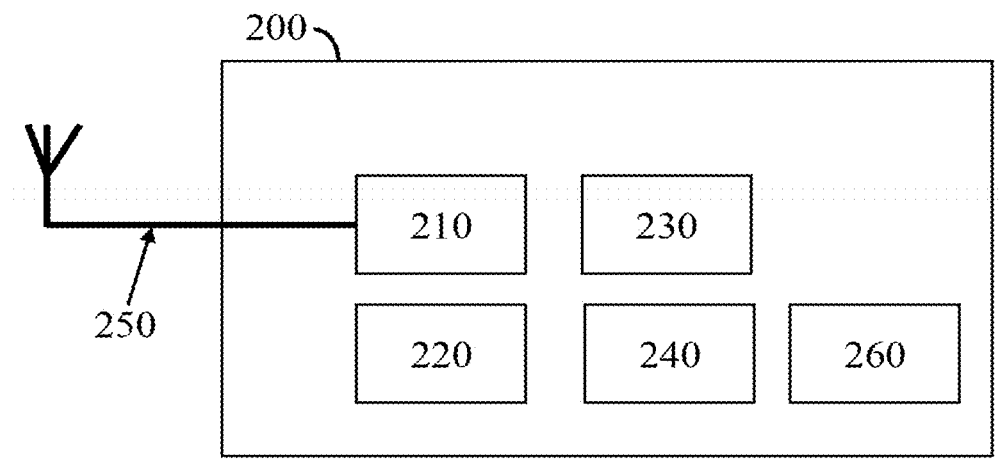
FIG. 1 shows device forming a node of a wireless sensor network according to an embodiment.

In an embodiment, a method for determining a transmission schedule for transmissions from a plurality of child nodes to a parent node in a wireless network is provided, wherein each child node is configured to send messages directed to a root node of the network via the parent node, the method comprising the parent node: dividing a first time period into a plurality of timeslots; assigning a MAC protocol to each child node for transmission of data to the parent node; allocating each timeslot to one or more child nodes for transmission to the parent node according to the MAC protocol assigned to them; transmitting details of the respective assigned MAC protocol and allocated timeslot to each of the child nodes.

For the avoidance of doubt, by child and parent node it is meant two nodes within direct transmission/reception range of each other, i.e. no intermediary node is required to relay data between them and they are one-hop neighbouring nodes in the network. All data transmitted from the child node is routed via the parent node.

For the avoidance of doubt, by MAC (Medium Access Control) protocol it is meant the protocol by which the data link layer of a communication system operates. In the context of wireless networks, therefore, it is the protocol regulating data flow between one-hop neighbouring nodes in the network.

One or more child nodes may be assigned a schedule-based MAC protocol. One or more child nodes may be assigned a TSCH-based MAC protocol. One or more child nodes may be assigned a contention-based MAC protocol. One or more child nodes may be assigned a CSMA/CM-based protocol. Each of the child nodes may be assigned different protocols. Some of the child nodes may be assigned the same protocol.

A first MAC protocol may be assigned to a first child node and a second MAC protocol assigned to a second child node. The first and second MAC protocols may be different or the first and second MAC protocols may be the same. The first child node may be assigned a contention-based MAC protocol and the second child node may be assigned a schedule-based MAC protocol.

The wireless network may be a star network. The wireless network may be a multi-hop mesh network.

Each timeslot may be allocated to a different child node. Some timeslots may be allocated to a plurality of nodes. All of the child nodes may be allocated a timeslot. Some child nodes may not be allocated a timeslot.

The first time period may be a transmission superframe.

A contention-based MAC protocol may be assigned to a single node or it may be assigned to at least two child nodes. The at least two child nodes assigned a contention-based MAC protocol may be allocated the same or different timeslots. More than one timeslot may be assigned to the same node.

A contention-based MAC protocol may be assigned to a plurality of child nodes; the nodes may be divided into a first group and a second group; a first timeslot may be allocated to the child nodes in the first group and a second timeslot may be allocated to the nodes in the second group.

The nodes may be clustered into groups with no hidden nodes.

A first and a second MAC protocol may be assigned to a first child node and a first timeslot may be assigned to the first child node for transmission according to the first MAC protocol and a second timeslot may be assigned to the first child node for transmission according to the second MAC protocol.

A contention-based MAC protocol may be assigned to a plurality of child nodes and a schedule-based MAC protocol may be assigned to at least one child node and the timeslot assigned to the plurality of child nodes for transmission according to the contention-based MAC protocol may be different to the timeslot assigned to the at least one child node for transmission according to a schedule-based MAC protocol.

The network may be multi-hop wireless network and wherein at least one of the child nodes is itself a parent node to at least one child node, i.e. the parent node may be a cluster head in a mesh-network.

The first child node may be assigned a protocol based on one or more of: required throughput of data from the child node to the parent node, the total number of child nodes, and the percentage of child nodes hidden from the first child node.

The details of respective assigned MAC protocol and allocated timeslot to each of the child nodes at the beginning of the first time period may be conducted using back-to-back synchronous transmission based broadcast control signalling.

In an embodiment, a method for determining a transmission schedule for transmissions from a plurality of child nodes to a parent node in a wireless network is provided, wherein each child node is configured to send messages directed to a root node of the network via the parent node, the method comprising the parent node: dividing a first time period into a plurality of timeslots; assigning a MAC protocol to each child node for transmission of data to the parent node; allocating each timeslot to one or more child nodes for transmission to the parent node according to the MAC protocol assigned to them; transmitting details of the respective assigned MAC protocol and allocated timeslot to each of the child nodes, the method further comprising: dividing a second time period into a plurality of timeslots; assigning a MAC protocol to each child node for transmission of data to the parent node during the second time period; allocating each timeslot into which the second period is divided to one or more child nodes for transmission to the parent node according to the MAC protocol assigned to them; transmitting details of the respective assigned MAC protocol and allocated timeslot to each of the child nodes at the beginning of the second time period, wherein the MAC protocol assigned to at least one child node for transmission of data to the parent node during the first time period is different from the MAC protocol assigned to the at least one child node for transmission of data to the parent node during the second time period.

In an embodiment, a method for transmitting data in a multi-hop wireless network is provided, the method comprising transmitting data according to a schedule determined by: dividing a first time period into a plurality of timeslots; assigning a MAC protocol to one or more child node for transmission of data to the parent node during the first time period; allocating one or more of said plurality of timeslots into which the first period is divided to said one or more child nodes for transmission to the parent node according to the MAC protocol assigned to them; transmitting details of the respective assigned MAC protocol and allocated timeslot to said one or more child nodes.

In an embodiment, a wireless device for transmission over a mesh network is provided, the network comprising a plurality of nodes configured to forward messages towards a root node, the wireless device comprising: a wireless interface for wirelessly communicating with nodes in the network; a controller configured to; divide a first time period into a plurality of timeslots; assigning a MAC protocol to one or more child node for transmission of data to the parent node during the first time period; allocate one or more of said plurality of timeslots into which the first period is divided to said one or more child nodes for transmission to the parent node according to the MAC protocol assigned to them; transmit details of the respective assigned MAC protocol and allocated timeslot to said one or more child nodes.

The wireless device may form part of a wireless network. The wireless device may be one of a plurality of wireless devices with the same or equivalent functionality forming a network or part of a network.

In an embodiment, a computer readable medium is provided, the computer readable medium comprising instructions that, when executed by a processor, cause the processor to: divide a first time period into a plurality of timeslots; assigning a MAC protocol to one or more child node for transmission of data to the parent node during the first time period; allocate one or more of said plurality of timeslots into which the first period is divided to said one or more child nodes for transmission to the parent node according to the MAC protocol assigned to them; transmit details of the respective assigned MAC protocol and allocated timeslot to said one or more child nodes.

In an embodiment, a computer readable medium is provided the computer readable medium comprising instructions that, when executed by a processor, cause the processor to: transmit data according to a schedule determined by: dividing a first time period into a plurality of timeslots; assigning a MAC protocol to one or more child node for transmission of data to the parent node during the first time period; allocating one or more of said plurality of timeslots into which the first period is divided to said one or more child nodes for transmission to the parent node according to the MAC protocol assigned to them; transmitting details of the respective assigned MAC protocol and allocated timeslot to said one or more child nodes.

In an embodiment, a method of dynamically dividing and scheduling communication time within a mesh network after receiving a configuration packet from a parent node is provided, wherein the communication schedule for each node consists of multiple time-varying communication slots across a superframe. The method may comprise assigning contention-based MAC periods across a one or more minimum bounded time slots over at least one frequency channel in a larger superframe. The method may comprise assigning either a contention-based (IEEE 802.15.4-2015 CSMA/CA) or schedule-based (IEEE 802.15.4-2015 TSCH) MAC layer within a single-hop star network. The method may comprise determining which nodes within a single-hop area are assigned either a contention-based or schedule-based MAC layer, based on the following input parameters: required throughput, number of transmitting nodes, and percentage of hidden nodes. The method may be such that different MAC approaches are scheduled for different nodes within a superframe. The method may be such that different MAC approaches are scheduled for a single node across multiple communication slots in a superframe. The method may be such that contention periods are scheduled within a superframe for a subset of mesh nodes, and that this contention period does not interfere with scheduled slot periods.

In a multi-hop mesh network the scheduling of the MAC approach (either contention or scheduled) for one-hop child nodes may be delegated to cluster heads in a distributed manner.

In an embodiment, a method of signalling initiated by a cluster head to alert one-hop child nodes of the schedule created and which MAC approach should be adopted during this schedule is provided.

In an embodiment, a method and algorithm for grouping contention nodes, based on the required throughput, the Percentage Hidden Node (PHN), and the neighbouring node density, for every node within a single-hop area for a cluster-head is provided.

In an embodiment, a method of determining the required length of contention periods for a contention node group and scheduling that contention period across one or more minimum bounded timeslots is provided.

FIG. 1 shows a device 200 that forms a node of a wireless sensor network according to an embodiment. The device 200 comprises an input/output module 210, a microprocessor 220, a non-volatile memory 230 and a sensor module 240. The input/output module 210 is communicatively connected to an antenna 250. The antenna 250 is configured to receive signals from, and transmit signals to, other nodes in the sensor network. The microprocessor 220 is coupled to the input/output module 210 and to the non-volatile memory 230. The non-volatile memory 230 stores computer program instructions that, when executed, cause the processor 220 to execute program steps that implement the methods described herein. The processor 220 is also coupled to the sensor module 240 that is configured to generate information for transmission across the network including, but not limited to, measurements of an industrial process and changes in an environment within which the device 200 operates. Alternatively or additionally to the sensor module 240, the device 200 can contain an actuator module 260. The actuator module 260 is coupled to the microprocessor 220 and is configured to move or control a mechanism external to the device 200.

In one embodiment the device 200 is configured to operate in accordance with the IEEE 802.15.4 standard.

Whilst in the embodiment described above the antenna 250 is shown to be situated outside of, but connected to, the device 200 it will be appreciated that in other embodiments the antenna 250 forms part of the device 200.

Figure 2:
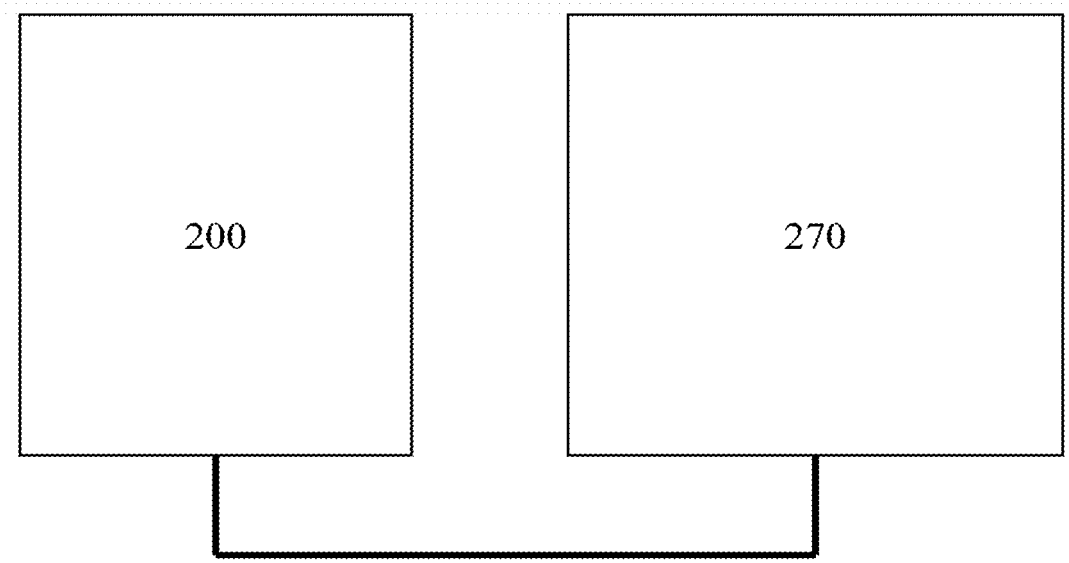
FIG. 2 shows a system comprising the device of FIG. 1.

FIG. 2 shows a system comprising the device 200, communicatively connected to a computing system 270. In an embodiment the connection between the two systems is established via an additional output port (not shown) of the device 200. The computing system 270 may, in one embodiment, be part of an industrial control system, with the device 200 acting as a root node for a network of sensors that generate data concerning an industrial process. By determining a network topology using the methods described herein the computing system 270 can more reliably receive data from the sensor network, there enabling greater control of the industrial process.

In one embodiment the device 200 is a sensor node in a sensor network for monitoring an industrial process. The sensor node may be configured to perform any number of functions including, but not limited to, quality control, predictive machinery maintenance, and factory safety. Taking quality control as an example; the sensor module 240 may contain a camera that is capable of in-process inspection for quality control, thereby allowing the manufacturer to identify and resolve failures. In one embodiment, the sensor measurements are communicated to another sensor or machine in the sensor network which is capable of acting on this information, for example by displaying these measurements to a human operator of the industrial control system for interpretation.

Other uses outside of an industrial process are of course also possible. In fact, the methods and devices that are described herein can relate generally to any application of sensor technology, in particular to the Internet of Things (IoT), or more generally, to any wireless sensor network deployment comprising resource constrained sensors. For example, the methods and devices discussed herein could also be used in the healthcare sector where sensors are used for monitoring patient vitals.

Furthermore, despite the following description referring to sensor nodes, it is emphasized that the methods and devices discussed herein relate to any type of node that has an application in the Internet of Things (IoT) including sensor nodes, actuator nodes and nodes which are intended for relaying or processing data without any sensor or actuator capabilities.

As discussed above, networks of wireless sensors do not typically have predefined topologies as there are no wires present to constrain connections between nodes. Instead, there exist protocols which allow nodes to self-organise based on which nodes are in direct communication distance of each other and do not require any intermediary nodes to forward communications between them (i.e. they are one-hop neighbours). Protocols such as RPL (see above) organise nodes such that each node sends all messages directed towards a root node via one particular node, known as the parent node. The two nodes are said to be in a parent-child relationship.

Figure 8A:
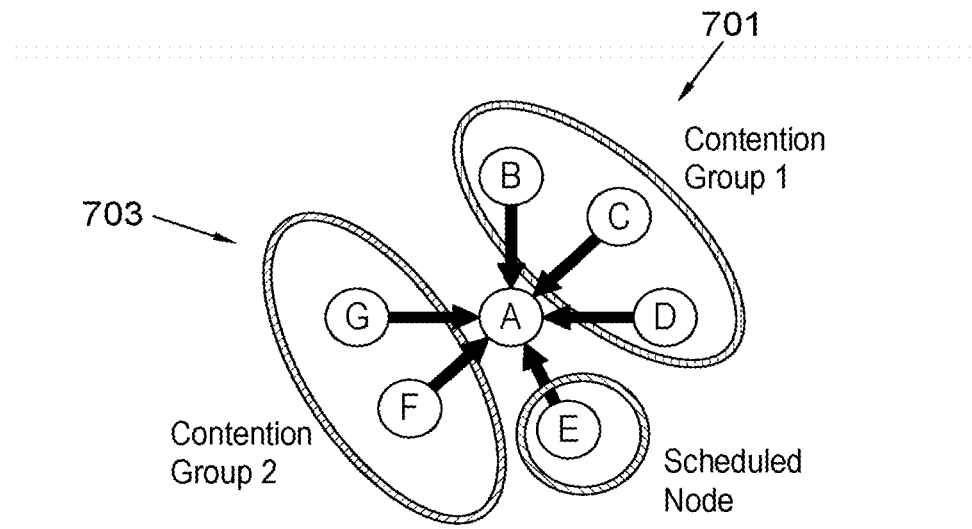
FIG. 8A shows an example of an output SDMM node grouping according to an embodiment.

FIG. 8A shows a simple example of a wireless network with a star topology. In star networks, a single parent exists (node A) and all other nodes (nodes B to G) are children of the parent node. Messages are sent directly from the all children to the single, central parent.

Figure 9:
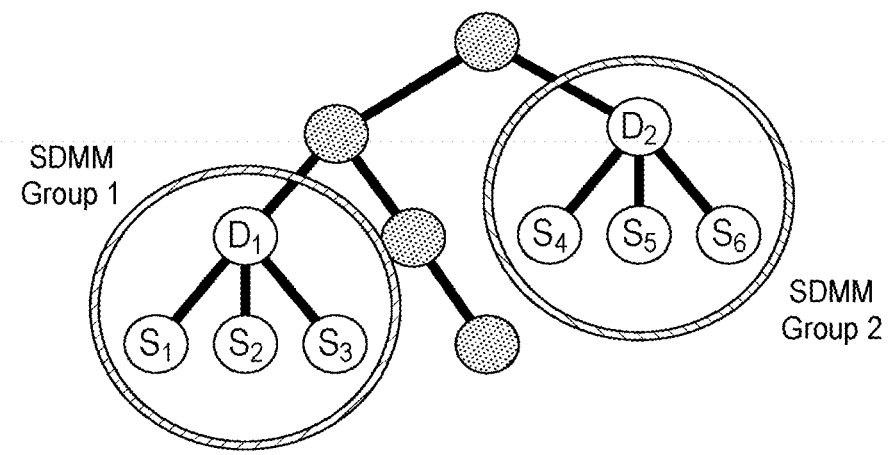
FIG. 9 shows an example of a multi-hop network with a tree-like topology.

FIG. 9 shows a simple example of a wireless network with a tree-like topology, such as that formed in RPL. The connections between nodes in the figure indicate nodes connected by a child-parent relationship. For example, node $S_1$ is a child of node $D_1$ and messages sent from $S_1$ are routed via $D_1$. $S_2$ and $S_3$ are also children to $D_1$. As can be seen from FIG. 9, in a mesh network such as that shown, there are several nodes which act as parents to one or more other nodes in the network and some nodes (such as $D_1$ and $D_2$) act as both parents and children within the network. Parent nodes in mesh networks such as $D_1$ are sometimes referred to as cluster heads (with corresponding cluster $D_1$, $S_1$, $S_2$, and $S_3$).

As can be seen from the examples shown in FIGS. 8A and 9, a parent node may have several children from which they may receive messages. It is therefore necessary to regulate the transmission of messages from the children in order to avoid simultaneous transmission by two or more children which could result in data loss.

Medium Access Control (MAC) protocols regulate the data flow between one-hop neighbouring nodes in a wireless network, i.e. nodes within direct transmission/reception range. A number of Medium Access Control (MAC) protocols are known in the art. Categories of MAC protocols include contention-based MAC protocols, where several nodes may transmit during the same time slot and schedule-based MAC protocols, where nodes are exclusively allocated transmission time and resources.

In an embodiment, a hybrid grouping and scheduling method combining different MAC layer methods to adaptively group and schedule nodes' communications is employed. This method will hereafter be referred to as Software Defined Massive Mesh (SDMM). In this embodiment, both contention-based MAC protocols and schedule-based MAC protocols are employed together and adaptively within the same star network, or cluster head in a mesh network. This embodiment will now be described in detail.

An example of a contention based MAC layer is Carrier Sense Multiple Access/Collision Avoidance (CSMA/CA). This is an asynchronous contention-based MAC layer used in many wireless communications stacks, notably in IEEE 802.11 WiFi, and is included as a MAC option in the IEEE 802.15.4 standard, both incorporated herein by reference in their entirety. Nodes transmit opportunistically, barring duty-cycle limits, but will first check to see if the channel is clear. If this is not the case, then the node will wait a random period of time (the backoff period) before trying to transmit again.

An example of a schedule-based MAC layer is the Time Scheduled Channel Hopping (TSCH) MAC layer introduced in the IEEE 802.15.4e-2012 standard amendment, which is incorporated herein by reference in its entirety, provided an alternative to asynchronous CSMA/CA MAC layers. TSCH schedules channel access across both time and frequency. However, TSCH does not specify a mechanism for building and maintaining the TSCH schedule, leaving it to the higher layers to define either a static schedule, or allow nodes to contest timeslots on a contention basis. The IPv6 over the TSCH Mode of IEEE 802.15.4e (6TiSCH) standard, incorporated herein by reference in its entirety, bridges this gap by defining mechanisms to allow distributed and centralised scheduling of the TSCH slotframe, leaving it to the scheduler to define the specific timeslots communications take place, and whether those slots are dedicated (i.e. there will be no intra-network interference from other communications), or shared (i.e. a communications link may be interfered from concurrently scheduled communications).

Contention-based and scheduled-based MAC approaches have different advantages and disadvantages. For example, with contention-based MAC approaches, high throughput in a dense single-hop area can cause contention that is exacerbated by the hidden and exposed node problems.

Figure 3:
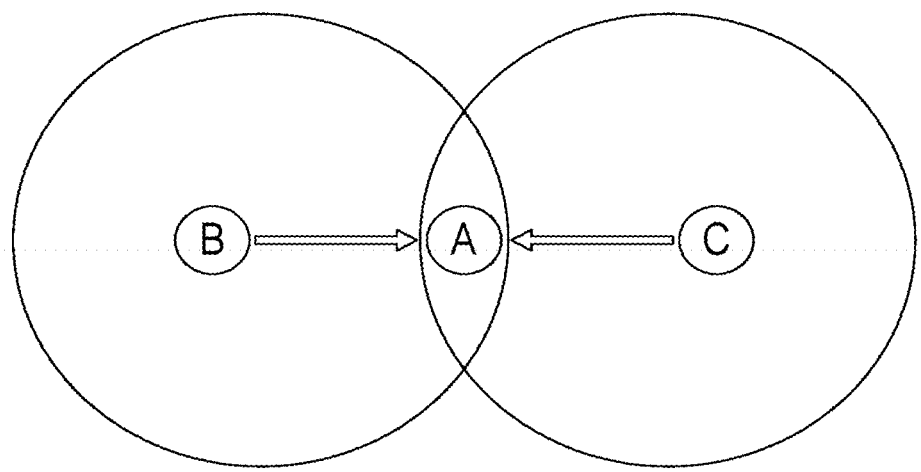
FIG. 3 shows an example of the hidden node problem.

A simple example of the hidden node problem is shown in FIG. 3. Hidden nodes occur when two or more senders, which are mutually exclusive of each other's physical communication range, want to send packets to the same receiver. It results in transmission failure of all nodes sending data packets to the receiver simultaneously and neither packets getting through. With other upper layer mechanisms such as MAC re-transmission, packets could eventually be successfully received by the receiver, but the throughput can be influenced significantly especially when a node is transmitting a large number of large packets over a prolonged period.

The network of FIG. 3 has three nodes: A, B and C. In this example, nodes B and C are children of node A, i.e. transmissions of data from these nodes are routed via node A. Nodes B and C are hidden from each other, i.e. are not within direct transmission/reception range of each other, and therefore may both attempt to send packets to A at the same time.

In contrast, with scheduled-based MAC approaches (such as TSCH), contention in networks such as that shown in FIG. 3 can be mitigated because nodes B and C will be assigned separate timeslots in which to transmit to node A. However, the throughput of data is limited by the number of nodes in a single-hop area and the length of a timeslot in the TSCH slotframe. For example, given a 10 ms timeslot, and 100 nodes in a single hop, the maximum throughput is 1 packet per second for non-contending communications.

Figure 4:
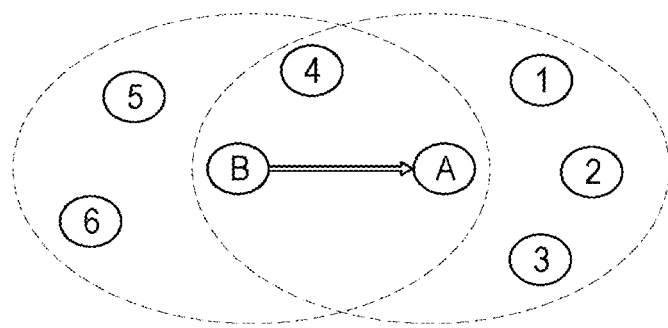
FIG. 4 shows a further example of the hidden node problem.

For the distributed contention-based MAC approach such as CSMA/CA, hidden nodes can result in significant influence on the performance (i.e. throughput or packet delivery ratio) of it. As a result, the analysis of the impact on hidden node problem is significant. To calculate the hidden node percentage of a network, each link should be taken into consideration. FIG. 4 shows a more complicated example of the hidden node problem. In the example of FIG. 4, node B wants to transmit packets to node A. Node A has one-hop neighbours of node 1, 2, 3 and node 4, while node B has one-hop neighbours of node 4, 5 and node 6. Since node B can sense node 4 which is in the communication range of node A, node 4 is not a hidden node while the rest of node A's neighbours are hidden from node B.

As a result, the total number of nodes hidden from node B and the hidden node percentage in the B(sender)→A (receiver) communication link can be calculated as follows:

$$H_{BA} = |N_A - N_A \cap N_B| \quad (1)$$

$$P_{BA} = \frac{100\% \times H_{BA}}{|N_A|} \quad (2)$$

Where $N_A$ and $N_B$ are sets which represent the one-hop neighbours of node A and node B respectively. $H_{BA}$ is number of nodes hidden from node B if the receiver is node A and $P_{BA}$ is the hidden node percentage of this communication link.

For the communication between node B and node A in a bi-directional way, the hidden node percentage can be calculated as follows:

$$H_{AB} = |N_B - N_A \cap N_B| \quad (3)$$

$$H_{BA} = |N_A - N_A \cap N_B| \quad (4)$$

$$P_{AB+BA} = 100\% \times \frac{1}{2}\left(\frac{H_{AB}}{|N_B|} + \frac{H_{BA}}{|N_A|}\right) \quad (5)$$

To simplify the situation, for the hidden node percentage of the whole of a star network, the overall hidden percentage can be calculated as:

$$P_n = \frac{1}{n}\sum P_{ij} \quad (6)$$

Where $P_n$ is the hidden node percentage of the whole star network, i.e. the hidden node percentage amongst the children of a single parent node; n is the number of nodes in the network; and $P_{ij}$ is the hidden percentage of each communication link (i.e. unicast or bi-directional).

In the example of FIG. 4, the $H_{AB}=|3-1|=2$, $$P_{AB} = \frac{H_{AB}}{|N_B|} = \frac{2}{3} \quad P_{BA} = \frac{H_{BA}}{|N_A|} = \frac{3}{4}.$$

Thus is follows that the hidden node percentage for the link between A and B is $$P_{AB+BA} = \frac{\frac{2}{3} + \frac{3}{4}}{2} = 70.8\%.$$

Figure 5A:
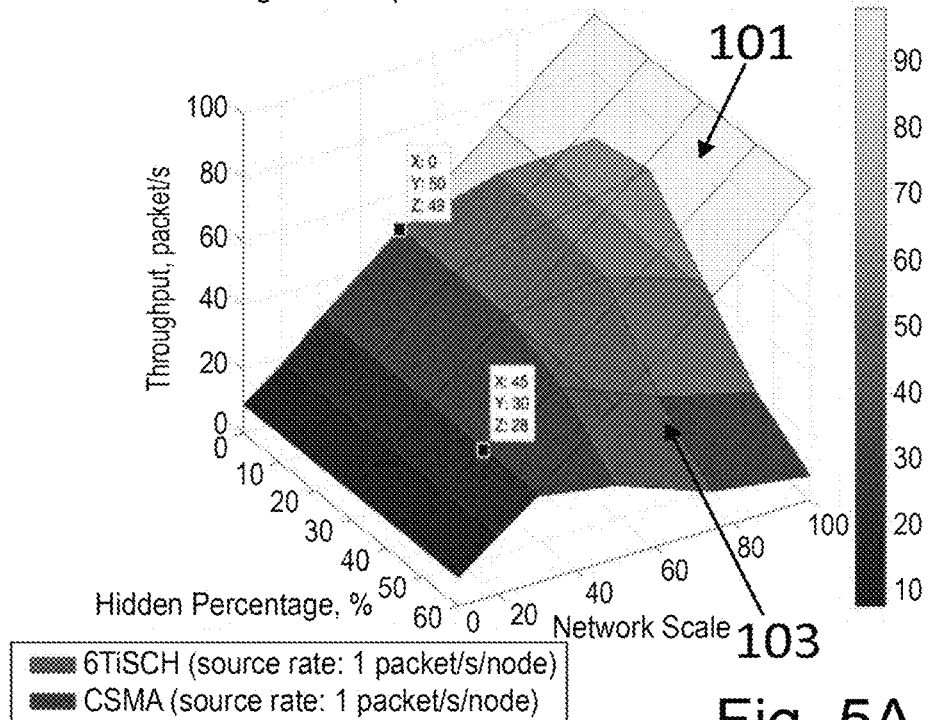
FIG. 5A shows a comparison the performance of 6TiSCH (schedule-based) and CSMA (contention-based) MAC protocols for throughput.
Figure 5B:
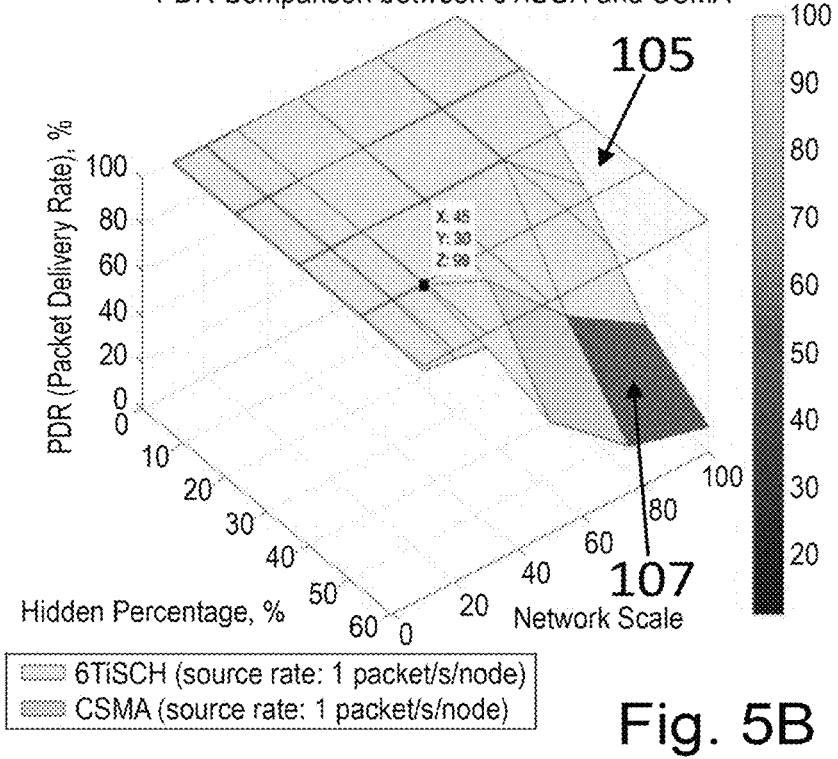
FIG. 5B shows a comparison the performance of 6TiSCH (schedule-based) and CSMA (contention-based) MAC protocols for packet delivery rate.

FIG. 5A and FIG. 5B show a comparison between the performance of 6TiSCH (schedule-based) and CSMA (contention-based) MAC protocols. In FIG. 5A the throughput for 6TiSCH 101 and CSMA 103 is plotted as a as a function of network scale of a star network (i.e. the number of children of a single parent) and hidden node percentage, $P_n$, in the whole of a star network. In FIG. 5B the packet delivery rate for 6TiSCH 105 and CSMA 107 is also plotted as a function of network scale and hidden node percentage.

As shown in FIG. 5A and FIG. 5B, a scheduled and deterministic communication protocol such as 6TiSCH shows much better performance as indicated as compared to the CSMA/CA based approach in terms of both reliability and throughput under high node density (large network scale) and high percentage of hidden nodes. Note that the data given in FIG. 5A and FIG. 5B is generally applicable to all networks with a star configuration and for traffic directed to a cluster head in a multi-hop mesh network.

Figure 6:
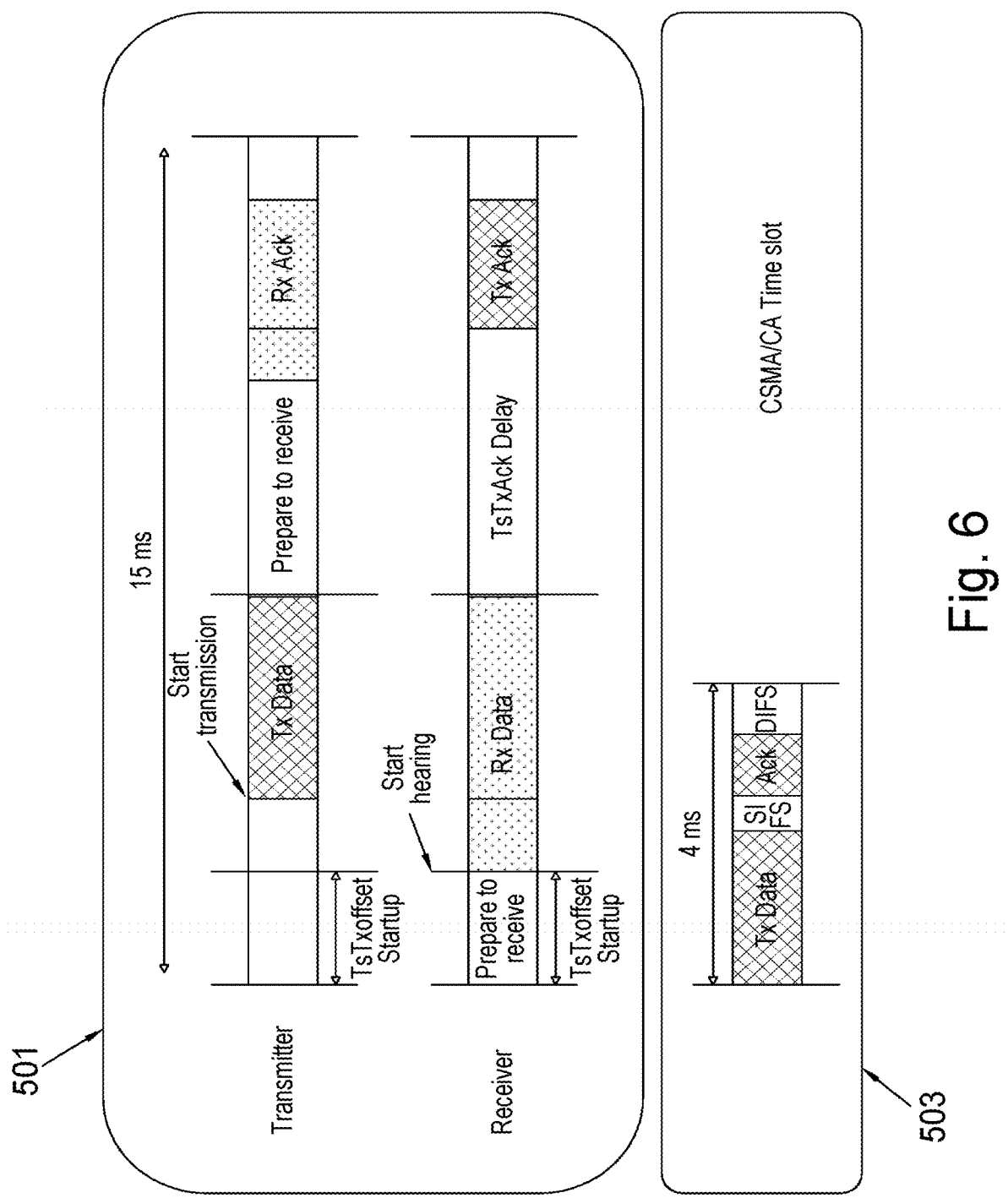
FIG. 6 shows a comparison between a 6TiSCH timeslot and a CSMA/CA timeslot.

Nonetheless, 6TiSCH requires a much longer period (10-15 ms) to transmit the same packet compared with the CSMA/CA approach (1-5) ms depending on packet payload size) due to scheduling and control purposes. This is shown in FIG. 6 which shows a 6TiSCH timeslot 501 and an equivalent timeslot for CSMA/CA 503 for transmitting a packet with, for example, 60 bytes of payload. As can be seen from FIG. 6, a 15 ms timeslot is required for 6TiSCH. In contrast, only a 4 ms timeslot is required for transmitting the same packet using the CSMA/CA protocol.

In addition, regardless of the actual transmission packet length, the packet transmission period defined in 6TiSCH is based on the maximum allowed payload length which is 127 bytes according to the IEEE 802.15.4-2015 standard. This is however, could be significantly reduced in CSMA/CA if the actual packet length is only 60 bytes or even less than 10 bytes, as there is no defined transmission period. Therefore, CSMA/CA is potentially able to offer a higher network throughput than 6TiSCH providing there are no packet collisions in the network.

In SDMM, a hybrid grouping and scheduling method combining different MAC layer methods to adaptively group and schedule nodes' communications is employed. In this method, where possible CSMA/CA can be applied to individual groups of child nodes without a hidden node problem in order to enhance their throughput, while 6TiSCH scheduling can be further utilized to coordinate communications among different groups or for individual communications.

Figure 7:
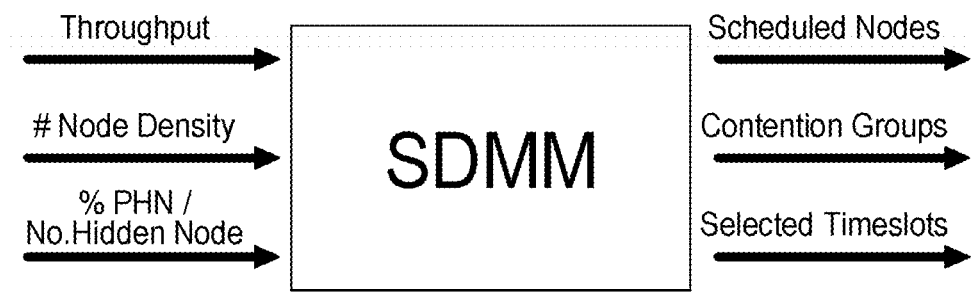
FIG. 7 shows a schematic representation of the SDMM scheduling method, according to an embodiment.

FIG. 7 shows a schematic representation of the SDMM scheduling method, according to an embodiment. In this embodiment, SDMM defines a mechanism in which the node density, the Percentage Hidden Node (PH N) or number of absolute hidden nodes, and the required traffic rate (throughput) are combined and evaluated against the results presented in FIGS. 5A and 5B to determine whether nodes should be assigned to a contention-based or a schedule-based MAC time slot. This process is described in detail below. In an embodiment, the SDMM scheduling method outputs a schedule with child nodes assigned both a MAC-protocol and a shared or individual set of timeslots for transmission to the parent node, as appropriate.

Figure 8B:
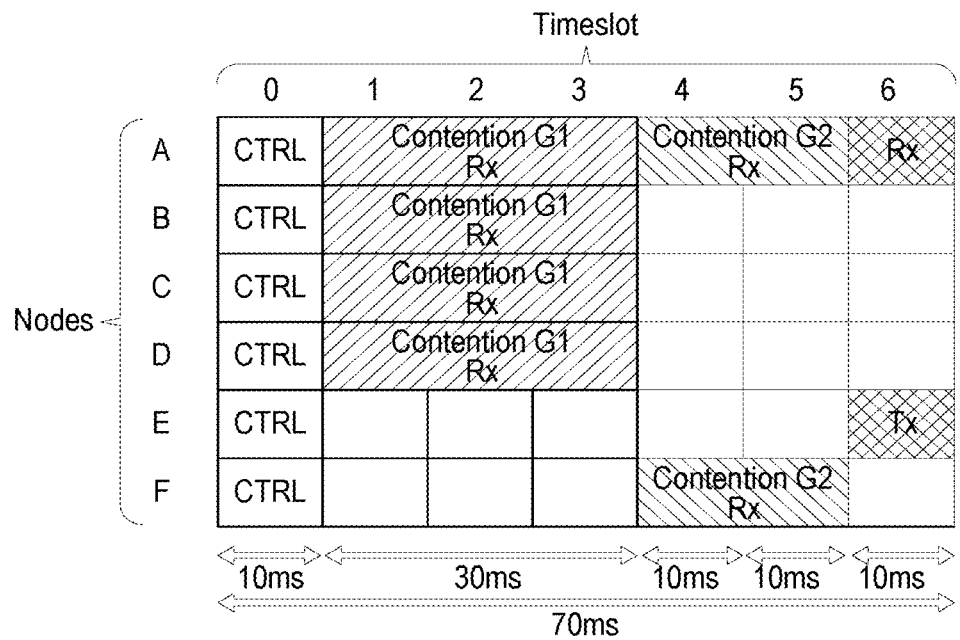
FIG. 8B shows an example of a schedule corresponding to the node grouping of FIG. 8A.

FIG. 8A and FIG. 8B show an example of an output SDMM node grouping and a corresponding schedule, respectively, for a star network according to an embodiment. In the example of FIGS. 8A and 8B, a set of six nodes, B to G are configured to transmit data via parent node A, which lies in a single-hop radius of all six nodes. In this example, five of the children nodes have been divided into two sets, 701 (nodes B, C and D) and 703 (nodes G and F), to be scheduled in a contention based manner. The sixth node, E is allocated a schedule-based protocol. Thus, different MAC protocols have been allocated to different nodes in order to maximise data transfer efficiency when transmitting to the same parent node.

FIG. 8B shows a corresponding example of a schedule for data transmission to node A according to SDMM. FIG. 8B shows a schedule for a single 70 ms superframe of time. The superframe is divided into a plurality of 10 ms TSCH timeslots 0 to 6.

In the example of FIG. 8B, timeslot 0 is allocated to a control signal transmitted from node A to the children nodes. In an embodiment SDMM employs Back-to-Back (B2B) Synchronous Transmission (ST) based broadcast control signalling with channel hopping to provide highly reliable and low-latency configuration of the communications superframe. Details of such broadcast control signalling is given in "Competition: Synchronous Transmissions based Flooding for Dependable Internet of Things" Raza; International Conference on Embedded Wireless Systems and Networks—Dependability Competition, At Uppsala, Sweden, Volume: 2017. In this embodiment, control signalling is encapsulated within one or more standard TSCH slots. While other control signalling implementations could be used according to embodiments (for example, a single all-nodes multicast packet), ST-based control according to an embodiment allows near guaranteed reception of the upcoming schedule at theoretical minimal bounds of latency. This allows SDMM to reconfigure the communications schedule every superframe, whereas the unreliability of other approaches means they would take far longer to guarantee all nodes are following the latest schedule configuration.

The remaining timeslots are allocated to nodes according to the node grouping shown in FIG. 8A.

Contention group 1 701 is allocated to timeslots 1-3. During this timeslot, the nodes belonging this this group (nodes B, C and D) transmit opportunistically after checking that the channel is clear, according to a contention-based transmission protocol. In this example, because all of the nodes are visible to each other (i.e. not hidden) no hidden node problems will arise from this group.

Contention group 2, 703 is allocated timeslots 4 and 5. As with group 1, during this timeslot, the nodes belonging this this group (nodes F and G) transmit opportunistically after checking that the channel is clear, according to a contention-based transmission protocol. Again, as nodes F and G are visible to each other, the hidden node problem described above does not arise.

Node E is allocated timeslot 6, a dedicated timeslot for transmission according to TSCH protocol. Node E may have been allocated this timeslot due to a number of factors. For example, the data transmitted from node E may be considered mission critical and therefore requiring a high quality of service guarantee or have latency requirements that must be met. Alternatively, or additionally, several of the other children nodes (or all of the children nodes) may be hidden from it. These and other factors will be considered in detail below.

Thus, as can be seen in FIG. 8B, SDMM defines a mechanism in which one or more standard TSCH timeslots can encapsulate a contention-based MAC period, allowing interoperability of both contention and scheduled MAC approaches within a single network, thus providing a heterogeneous MAC layer.

In an embodiment, contention-based periods can be scheduled from zero up to and including all timeslots within a superframe, allowing multiple contention periods, for different groups of nodes, to be scheduled within a single superframe. For example, in the schedule of FIG. 8B, two different groups of nodes have been allocated contention periods. Thus, the communications schedule is dynamically configurable.

Thus, through a distributed mechanism SDMM enables portions of a multi-hop mesh network to dynamically switch MAC layers based on required throughput, number of co-located nodes, and % of hidden nodes in the area. The parent node in single-hop cluster monitors these three inputs from all child nodes, and adaptively selects and schedules either contention-based (CSMA/CA) or schedule-based (TSCH) MAC approaches for each node.

In an embodiment, SDMM extends the single-hop concept to a multi-hop mesh network, such as that shown in FIG. 9, by distributing control intelligence to individual cluster heads, allowing each cluster head full control over its own single-hop children. In this manner, local single-hop clusters benefit from the SDMM approach without incurring control signalling overhead between clusters or a central node. Thus, SDMM's grouping and resource allocation algorithm can run in a distributed fashion on each parent node of the tree mesh topology.

In an embodiment, the SDMM scheduling method is performed in a distributed manner by every parent node in a network. For example, FIG. 9 shows a multi-hop network with a tree-like topology, such as that created using RPL. In this embodiment, for example, node D1 is a parent to nodes S1, S2 and S3. Node D2 is parent to nodes S4, S5, S6. In an embodiment, therefore, node D1 will perform SDMM scheduling for nodes S1, S2 and S3. Likewise node D2 will perform SDMM scheduling for nodes S4, S5 and S6.

Figure 10:
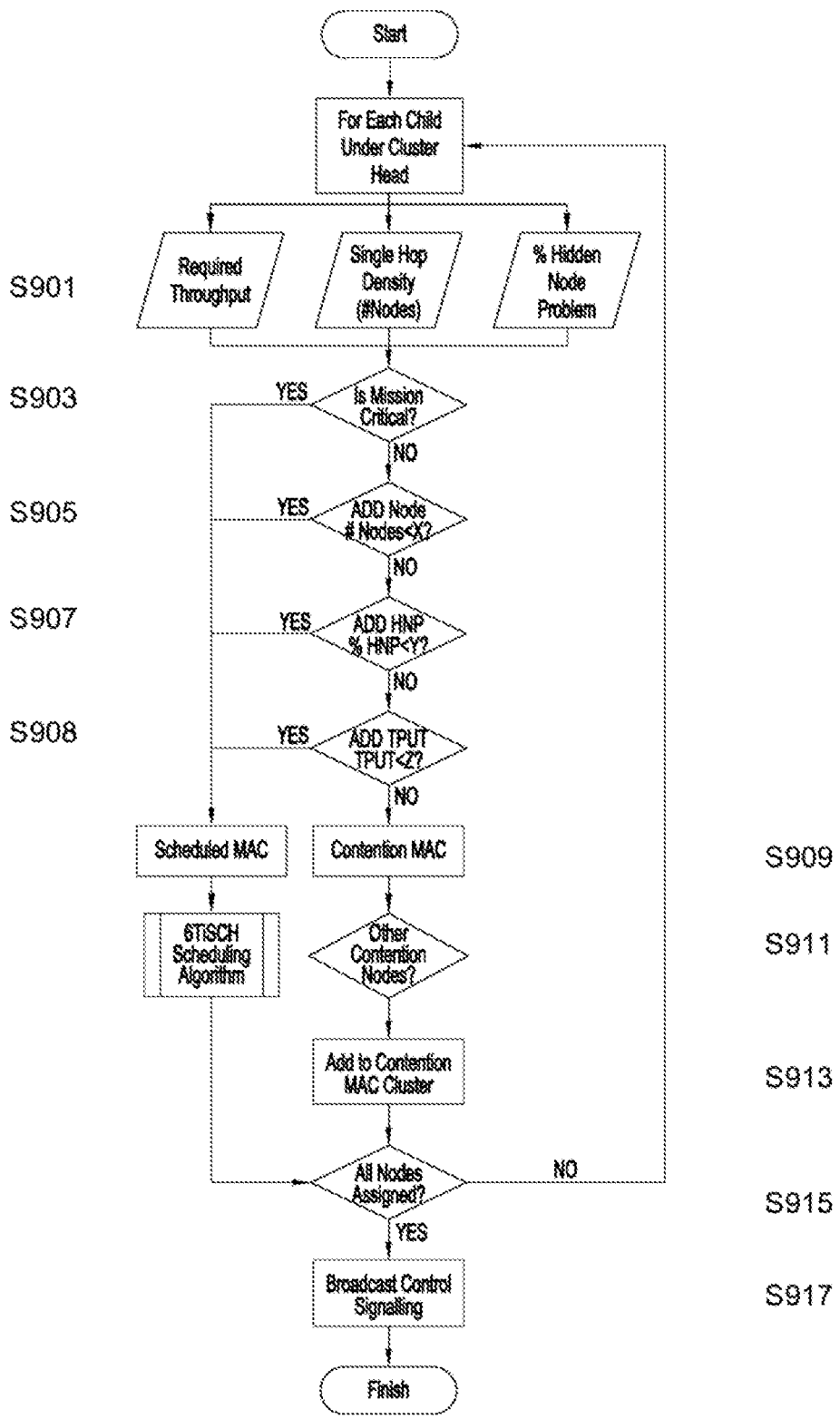
FIG. 10 shows a flowchart for scheduling nodes according to an embodiment.

The process of selection and scheduling according to an embodiment is demonstrated in the flowchart presented in FIG. 10.

In an embodiment, this process is carried out by a cluster head for every child node under it.

In step S901 the parent node collates the inputs required for node grouping and scheduling, as shown above in FIG. 7. In an embodiment, the inputs comprise the following:
1) The required throughput of data. In an embodiment, this data comprises the required throughput of data from the specific child node under consideration to the parent node.
2) The single hop density for child in question, i.e. the total number of one-hop neighbours in the network to the child node. Note that not all of these neighbours will necessarily be children of the cluster head.
3) The percentage of hidden nodes (PHN) for the child node in question, i.e. the number of children to the cluster head that are hidden from the child node in question.

In an embodiment, the above inputs are determined by control signalling during the formation of the network dependent on control signalling generated by existing network formation protocols. For example, in the case of RPL, clusters are formed according to a desired RPL Objective Function (OF).

In step S903, the parent node determines if the child node is mission critical. In an embodiment, this is determined by control signalling. Mission critical may mean that the node has critical traffic with hard latency, reliability or throughput requirement. If the parent node determines that the child node is mission critical, it assigns a scheduled-based MAC protocol to the child node as a schedule-based MAC protocol guarantees that a timeslot is exclusively allocated to the node for transmission to the parent and therefore transmission of the mission critical data can be assured. If the parent node determines that the child node is not mission critical, it continues to step S905.

In step S905, the parent node determines the number of nodes N processed so far under the cluster head. The parent node may compare N with a threshold value X. If the number of nodes processed exceeds the threshold X, then the method continues to step S907. If the number of nodes processed does not exceed the threshold then the node is assigned a scheduled MAC protocol.

In an embodiment, the value of the threshold X may be determined using the data in FIGS. 5A and/or 5B. For example, from FIG. 5A, it can be determined that 6TiSCH provides a higher throughput for all networks with more than 50 nodes, regardless of the hidden node percentage present in the network. Therefore, in an embodiment, X is chosen to be 50. In other embodiments, different factors may be prioritised and other thresholds chosen.

In step S907, the parent node determined the PHN at the clusterhead so far. The parent node may compare PHN with a threshold Y. If the PHN exceeds the threshold Y, then the method continues to step S908. If the PHN does not exceed the threshold then the node is assigned a scheduled-based MAC protocol.

In an embodiment, the value of the threshold Y may be determined using the data in FIGS. 5A and/or 5B. For example, from FIG. 5A, it can be determined that for networks of 30 nodes and above, 6TiSCH provides a higher throughput for networks with a HNP greater than 45%. Therefore, in an embodiment, when N was determined to be 30 in step S907, Y is chosen to be 45%. In an embodiment, the threshold Y is calculated based on the data in FIG. 5A and the value of N determined in step S905 in order to optimise throughput. In other embodiments, Y may be calculated in order to prioritise different factors. The threshold Y may be the same regardless of the value of N.

In step S908, the parent node adds the required throughput from the node in question, (as determined in step S901) to a running total of throughput for traffic through the cluster head so far and compares this value with a threshold Z. If the running total is less than the value Z then the node is assigned a scheduled-MAC protocol. If the running total exceeds the value Z then the node is assigned a contention-based MAC protocol.

In an embodiment, the value Z is chosen using the data in FIGS. 5A and/or 5B using one or more of N and HNP. For example, it is clear from FIG. 5A that the smaller the cluster size, the smaller the throughput that can be handled using CSMA, therefore the smaller Z will be. Likewise, the greater the HNP, the smaller the throughput which can be achieved with CSMA, therefore the smaller Z. In an embodiment, Z is adaptively determined according to the value of N and HNP determined in steps S905 and S907.

In step S911, the parent node reviews the child nodes which have already been assigned a protocol and determines if any other child nodes have been assigned a contention-based MAC protocol.

In step S913, the child node is added to a contention-based MAC cluster. If it was determined in step S911 that no other child nodes have yet been assigned to a contention-based MAC protocol, then the child node in question will start its own contention cluster. If other child nodes are assigned a MAC protocol then the child node in question will either be assigned to an existing contention cluster or it will start its own cluster. Child nodes assigned to the same contention cluster will be scheduled into the same timeslots for transmission.

In an embodiment, in order to determine the node cluster to which to add nodes assigned a contention-based protocol the following calculations are performed.

Different from the shared timeslot definition in 6TiSCH, where each node can participate the contention during this period, in an embodiment the SDMM contention period only allows a maximum of N nodes to compete in its shared contention timeslot. In an embodiment, the value of N is be determined based on multiple parameters such as node density, node degree, network connectivity and topology, network traffic rate, and most importantly, the PHN ratio.

Figure 11A:
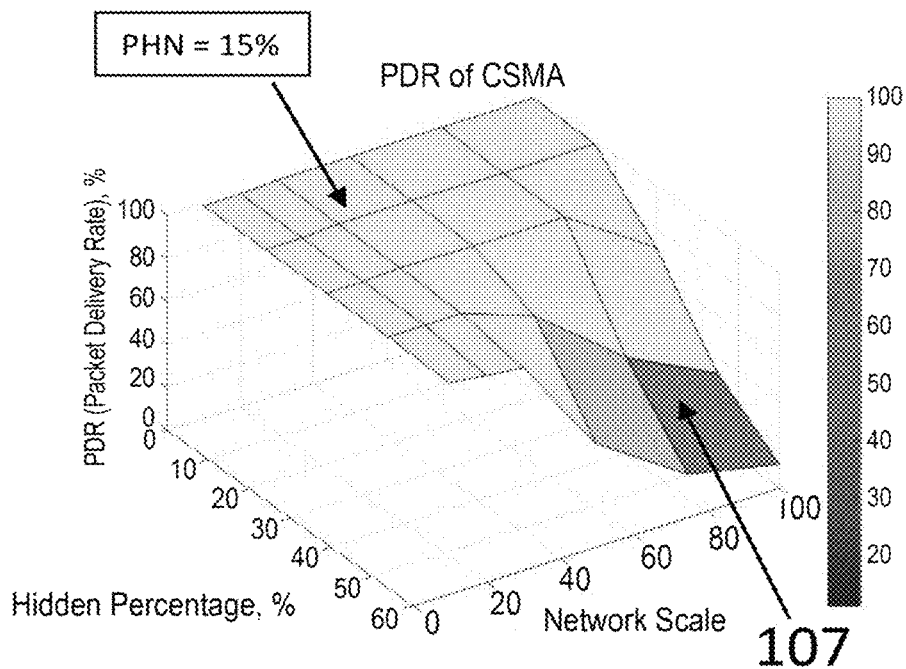
FIG. 11A shows the packet delivery rate as a function of hidden node percentage and network scale for CSMA.
Figure 11B:
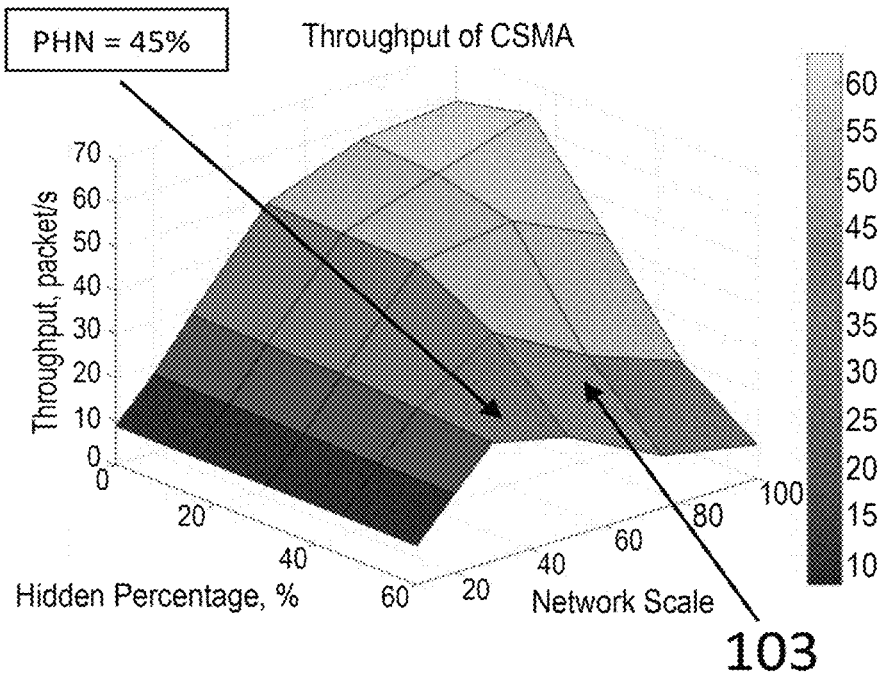
FIG. 11B shows the throughput as a function of hidden node percentage and network scale for CSMA.

One way of deciding the optimum number of N nodes to be grouped based on the PHN ratio within the group and node degree is provided by the results shown in FIGS. 11A and 11B, which show the packet delivery rate 107 and throughput 103 respectively as functions of hidden node percentage and network scale for CSMA. Note that this is the same data as shown in FIGS. 5A and 5B with the 6TiSCH data removed for clarity. In this example, when PHN is less than 15%, the CSMA/CA can achieve very high reliability (PDR>99.9%) and the total throughput increases when the number of nodes increases. In this case, the cluster size N may even be set to 100. However, When PHN=45%, the highest throughput can be only achieved when N=30. In this case, therefore the maximum cluster size of the CSMA cluster in the method of FIG. 10 may be set to 30.

In an embodiment, N and PHN values are computed using the data of FIGS. 11A and 11B. A grouping algorithm is then applied to create multiple groups with co-located nodes up to a maximum of N nodes per group with a certain PHN ratio in order to maximise the throughput while still maintain high communication reliability.

In an embodiment, nodes are clustered in order to completely eliminate hidden nodes within a cluster. An example of a greedy grouping algorithm 1 is described below according to an embodiment, which creates multiple groups without any hidden nodes. In an embodiment, any nodes which cannot be grouped so as to eliminate hidden nodes from a cluster will be assigned a scheduled-based MAC protocol. In this embodiment, there is no maximum N as the algorithm creates clusters with PHN of zero.

Grouping Algorithm 1

Input: child node contention list CN = $[n_1, n_2, \ldots , n_X]$, where X is the total number of child nodes.
Output: CSMA contention groups G = $[G_1, G_2, \ldots , G_Y]$, where Y is the total number of groups.
TSCH scheduled nodes list TN = $[tn_1, tn_2, \ldots , tn_z]$, where Z is the total number of TSCH scheduled nodes.
1:   x=y=z=1; % initialization
2:   WHILE CN ≠ Ø DO:
3:      Choose $n_i \in$ CN (1) as start point, where CN(1) is the first node in the list
4:      List all $n_i$ neighbours → List 1
5:      IF no neighbours THEN
6:         $n_i \to tn_x$ % Add $n_i$ to schedule cluster TN
7:         x = x +1
8:         Delete $n_i$ from CN
9:         IF CN = Ø
10:          Break;
11:        END IF
12:     END IF
13:     ELSE % has neighbours%
12:        List $n_i$'s neighbours' neighbours → List 2
13:        Find all common and duplicate nodes between List 1 and List 2 →List 3
14:     IF there are no common elements ∈ List 3
15:        % all neighbours are hidden from each other %
16:        $[n_i, list3(1)] \to G_y$
17:        y = y+1
18:     END IF
19:     ELSE there are common elements THEN
20:        Find the most frequent node list $L \in$ List 3
21:        $[n_i, L] \to G_y$
22:        y = y+1

-continued

Grouping Algorithm 1

```
23:         IF the size of G_y > N
24:             % where N is the maximum contention node number%
25:             Delete all nodes [G_y (N + 1), G_y (N + 2), ... G_y (Y)]
                from G_y
26:         END IF
27:         Delete nodes ∈ G_y from CN
28:     END IF
29:   END IF
30: END WHILE
```

In this embodiment, the effective hidden node percentage for the contentious time slots can be even further reduced by grouping.

Thus, SDMM calculates the optimal number of contention nodes by taking the average hidden node ratio into account.

In an embodiment, multiple timeslots and channels are assigned to different contention groups based on optimized scheduling functions. In an embodiment, SDMM supports channel hopping.

In step S915, the parent node determines if all child nodes have been assigned a MAC protocol or if child nodes remain that have not been assigned a protocol yet. If not, the process moves on to the next child node and returns to step S901. Once all child nodes have been assigned a protocol (and contention cluster, if appropriate), the process moves on to step S917.

In step S917, the parent node schedules the nodes clustered into contention clusters and the nodes assigned as schedule-based MAC protocol into timeslots within a superframe and broadcasts this schedule to all of the child nodes of the cluster head.

In an embodiment, SDMM performs standard 6TiSCH scheduling algorithms such as AMUS as described in PCT/GB2015/052538, which is hereby incorporated by reference, or DeTAS (as described in N. Accettura, E. Vogli, M. R. Palattella, L. A. Grieco, G. Boggia and M. Dohler, "Decentralized Traffic Aware Scheduling in 6TiSCH Networks: Design and Experimental Evaluation," in *IEEE Internet of Things Journal*, vol. 2, no. 6, pp. 455-470, December 2015), etc. based on traffic and schedule TSCH timeslots for each Contention MAC groups or each individual TSCH scheduled nodes, as shown in the example of FIG. 8.

In an embodiment, different channel-offsets can be assigned to the Contention MAC groups and the TSCH scheduled MAC nodes. The same channel hopping method of 6TiSCH could be applied to SDMM, thereby rendering the network more resilient to external interferences.

In an embodiment, SDMM can adaptively reconfigure the superframe schedule every superframe period, in response to changing input parameters, using control signalling.

In an embodiment, rather than employing contention or scheduled based communication for control signalling, SDMM employs a single ST-based broadcast using B2B transmissions across multiple frequency channels. This channel diversity provides highly reliable control configuration at minimum bounds of latency and can be completed within a standard 10 ms TSCH slot.

In an embodiment, once the schedule has been transmitted to the children, the nodes begin transmission to the parent in accordance with the determined schedule and assigned MAC protocol.

While FIG. 10 shows an example of a decision making process according to one embodiment, other decision-making processes could be employed according to embodiments. For example, a schedule-based MAC approach could be assigned to all nodes which are considered mission critical, while all other nodes are assigned to a single contention-based cluster. Alternatively all nodes may be assigned a contention-based MAC protocol but be clustered in order to avoid hidden nodes.

In a further embodiment, steps S905 and S907 may be omitted and only the mission critical nature of the data and the throughput (i.e. only step S908) may be taken into account when determining which protocol to assign to a child node. The skilled person will appreciate that other combinations of steps and methods may be employed in order to allocate protocols and timeslots to nodes according to embodiments.

Initial simulation evaluation for SDMM is conducted with 1 hop network consisting of 100 nodes, where Node 1 is the parent node and the rest of child Nodes are deployed such that the average probability of the hidden node PHN=50%. Nodes were assigned protocols and clustered according to the flowchart of FIG. 10.

Figure 12A:
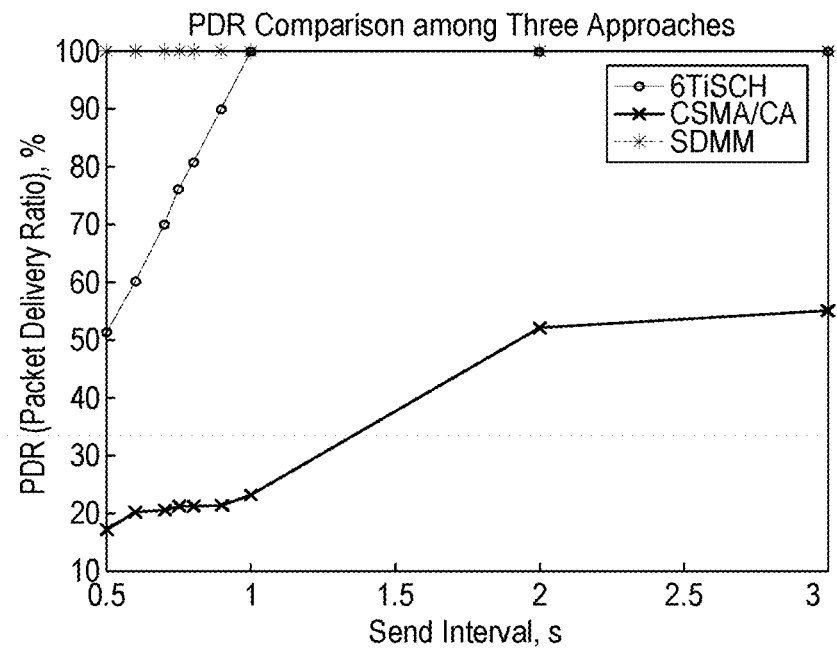
FIG. 12A shows a simulation result for the packet delivery rate of 6TiSCH, CSMA/CA and SDMM according to an embodiment.
Figure 12B:
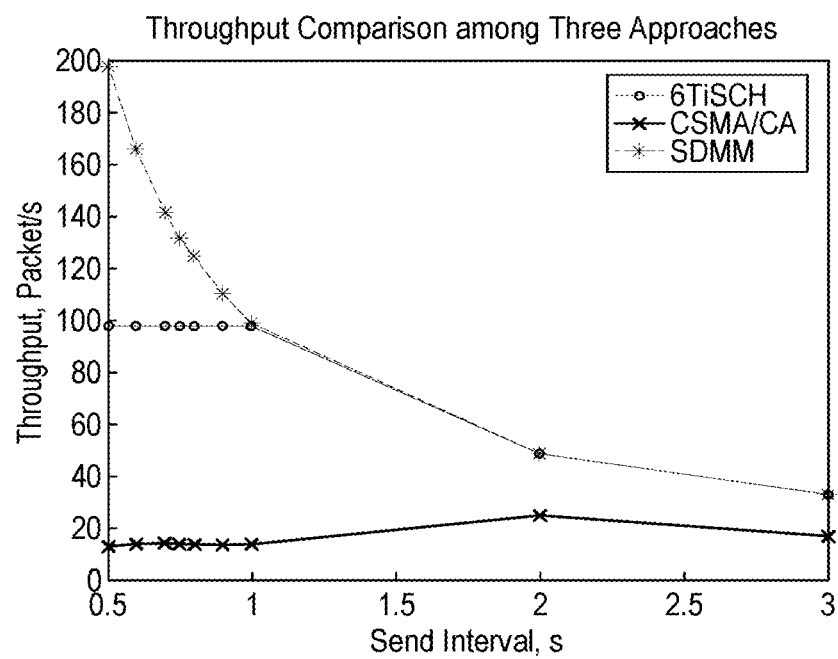
FIG. 12B shows a simulation result for the throughput of 6TiSCH, CSMA/CA and SDMM according to an embodiment.

Initial simulation results are shown in FIGS. 12A and 12B which compare packet delivery rate and throughput respectively for 6TiSCH, CSMA/CA and SDMM according to an embodiment. 6TiSCH's throughput was captured by 100 packet/s due to the 10 ms slot length, while the new SDMM method almost doubled the throughput compared with both 6TiSCH while maintaining very high reliability of more than 99.999%. This is mainly because the SDMM is able to group the neighbouring nodes which are not hidden from each other, hence significantly enhances the effectively throughput of CSMA/CA without causing collisions.

Thus SDMM defines a low-latency and highly reliable distributed control mechanism based on Synchronous Flooding (SF), allowing it to dynamically reconfigure the network in response to changing local conditions within the order of milliseconds. This differs from current SOTA communications approaches where, due to frequency hopping and Radio Duty Cycling (RDC) limitations, configuration settings can take tens of minutes to propagate across the mesh. The simulation results show that the new method almost doubled the throughput compared with both 6TiSCH and Wi-SUN FAN while maintaining very high reliability of more than 99.999%.

As described above, the SDMM approach according to embodiments described here provides the following advantages:

1. Increased data rates in high-throughput network clusters.
   The SDMM approach allows a low-power mesh network to address localised high-throughput traffic by adaptively scheduling different MAC approaches for node clusters depending on the current input parameters.
2. Interoperability with legacy MAC layers.
   Additionally, the heterogenous MAC layer in SDMM supports the coexistence of multiple MAC approaches, potentially allowing interoperability between legacy CSMA-based network devices, and more recent TSCH-based network devices.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method, comprising:
dividing a first time period into a plurality of timeslots;
assigning a protocol to at least one of a first child node or a second child node for transmission of data to a parent node during the first time period;
allocating one or more of the timeslots into which the first period is divided to the at least one of the first child node or the second child node for transmission to the parent node according to the protocol assigned to the parent node and the at least one of the first child node or the second child node; and
transmitting data of the assigned protocol and data concerning the allocated timeslots to the at least one of the first child node or the second child node,
wherein the protocol is selected from among a contention-based protocol and a schedule-based protocol, based on at least one of required throughput of data from the first child node or the second child node to the parent node, a total number of child nodes, or a percentage of child nodes hidden from the first child node, and
wherein the schedule-based protocol and the contention-based protocol are assigned to the first child node, a first timeslot is assigned to the first child node for transmission according to the schedule-based protocol, and a second timeslot is assigned to the first child node for transmission according to the contention-based protocol.

2. The method of claim 1, wherein a first protocol is assigned to the first child node and a second protocol is assigned to the second child node, wherein the first protocol and the second protocol are different.

3. The method of claim 2, when the first child node is assigned the contention-based protocol and the second child node is assigned the schedule-based protocol.

4. The method of claim 1, further comprising:
assigning the contention-based protocol to the first child node and the second child node; and
allocating a same timeslot of the timeslots to the first child node and the second child node.

5. The method of claim 4, further comprising:
allocating a first timeslot of the timeslots to the first child node; and
allocating a second timeslot of the timeslots to the second child node,
wherein the timeslot is different from the first timeslot, and the timeslot is different from the second timeslot.

6. The method of claim 4, further comprising:
assigning the contention-based protocol to a plurality of child nodes including the first child node and the second child node;
dividing the child nodes into a first group and a second group; and
allocating a first timeslot to the first group and a second timeslot to the second group.

7. The method of claim 6, further comprising dividing the child nodes into the first group and the second group such that there are no hidden nodes in the first group and no hidden nodes in the second group.

8. The method of claim 1, wherein the contention-based protocol is assigned to at least one of the first child node or the second child node, the schedule-based protocol is assigned to at least one of the first child node or the second child node, and wherein the timeslots assigned to the at least one of the first child node or the second child node for transmission according to the contention-based protocol are different from the timeslots assigned to the at least one of the first child node or the second child node for transmission according to a schedule-based protocol.

9. The method of claim 1, wherein the network is a multi-hop wireless network, and
wherein at least one of the first child node or the second child node is a parent node to at least one child node.

10. The method of claim 1, further comprising:
dividing a second time period into a plurality of second timeslots;
assigning a protocol to the at least one of the first child node or the second child node for transmission of data to the parent node during the second time period;
allocating one or more of the second timeslots into which the second period is divided to the at least one of the first child node or the second child node for transmission to the parent node according to the protocol assigned to the parent node and the at least one of the first child node or the second child node;
transmitting data of the assigned protocol and data concerning the allocated second timeslots to the at least one of the first child node or the second child node at the beginning of the second time period,
wherein the protocol assigned to at least one of the first child node or the second child node for transmission of data to the parent node during the first time period is different from the protocol assigned to the at least one of the first child node or the second child node for transmission of data to the parent node during the second time period.

11. The method of claim 1, wherein the network is a multi-hop mesh network.

12. The method of claim 1, wherein the transmitting of the data of the assigned protocol and the data concerning the allocated timeslots to the at least one of the first child node or the second child node at the beginning of the first time period is conducted using back-to-back synchronous transmission based broadcast control signalling.

13. A method for transmitting data in a multi-hop wireless network, the method comprising transmitting data according to a schedule determined by the method according to claim 1.

14. The method of claim 1, wherein the protocol is a MAC protocol.

15. The method of claim 1, wherein if the required throughput of data from the first child node or the second child node to the parent node exceeds a first threshold, if the total number of child nodes exceeds a second threshold, or if the percentage of child nodes hidden from the first child node exceeds a third threshold, the protocol is determined to be the contention-based protocol, and
if the required throughput of data from the first child node or the second child node to the parent node does not exceed the first threshold, if the total number of child nodes does not exceed the second threshold, or if the percentage of child nodes hidden from the first child node does not exceed the third threshold, the protocol is determined to be the schedule-based protocol.

16. A wireless device, comprising:
a controller configured to:
divide a first time period into a plurality of timeslots,
assign a protocol to at least one of a first child node or a second child node for transmission of data to the wireless device during the first time period,
allocate one or more of the timeslots into which the first period is divided to the at least one of the first child node or the second child node for transmission to the wireless device according to the protocol assigned to the wireless device and the at least one of the first child node or the second child node, and select the protocol from among a contention-based protocol and a schedule-based protocol, based on at least one of required throughput of data from the first child node or the second child node to the wireless device, a total number of child nodes, or a percentage of child nodes hidden from the first child node; and a wireless interface configured to transmit data of the assigned protocol and data concerning the allocated timeslots to the at least one of the first child node or the second child node, wherein the schedule-based protocol and the contention-based protocol are assigned to the first child node, a first timeslot is assigned to the first child node for transmission according to the schedule-based protocol, and a second timeslot is assigned to the first child node for transmission according to the contention-based protocol.

17. A wireless system comprising the first child node, the second child node, and the wireless device according to claim 16.

18. A non-transitory computer-readable medium storing a computer program which is executed by a processor to cause the processor to perform the steps of:

dividing a first time period into a plurality of timeslots;

assigning a protocol to at least one of a first child node or a second child node for transmission of data to a parent node during the first time period;

allocating one or more of the timeslots into which the first period is divided to the at least one of the first child node or the second child node for transmission to the parent node according to the protocol assigned to the parent node and the at least one of the first child node or the second child node;

selecting the protocol from among a contention-based protocol and a schedule-based protocol, based on at least one of required throughput of data from the first child node or the second child node to the parent node, a total number of child nodes, or a percentage of child nodes hidden from the first child node; and transmitting data of the assigned protocol and data concerning the allocated timeslots to the at least one of the first child node or the second child node, wherein the schedule-based protocol and the contention-based protocol are assigned to the first child node, a first timeslot is assigned to the first child node for transmission according to the schedule-based protocol, and a second timeslot is assigned to the first child node for transmission according to the contention-based protocol.

* * * * *